Jan. 15, 1963  E. P. GARRISON, SR  3,073,646
KITCHEN TRAILER
Filed March 31, 1961  3 Sheets-Sheet 1
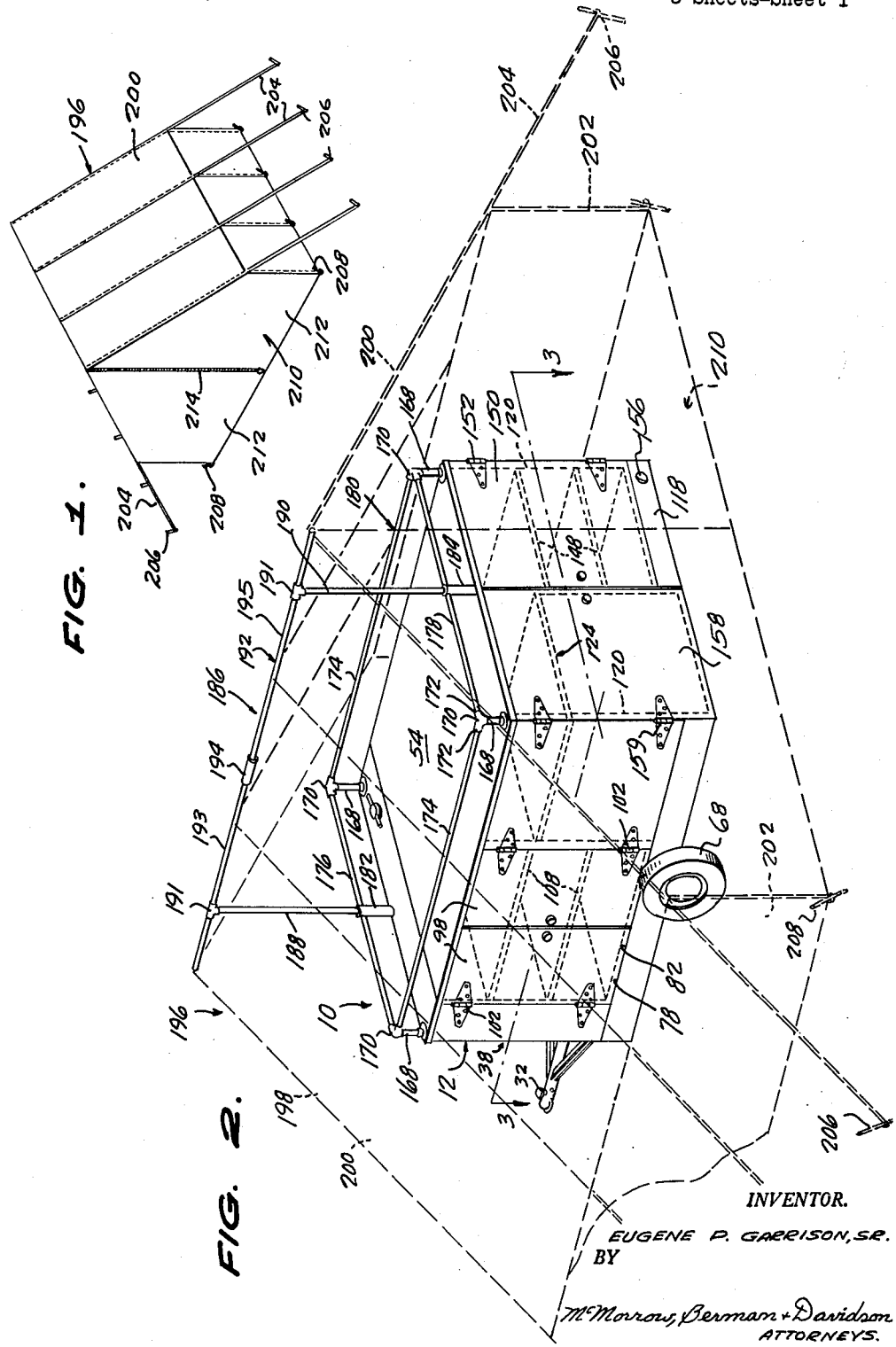
INVENTOR.
EUGENE P. GARRISON, SR.
BY
McMorrow, Berman + Davidson
ATTORNEYS.

Jan. 15, 1963  E. P. GARRISON, SR  3,073,646
KITCHEN TRAILER
Filed March 31, 1961  3 Sheets-Sheet 2
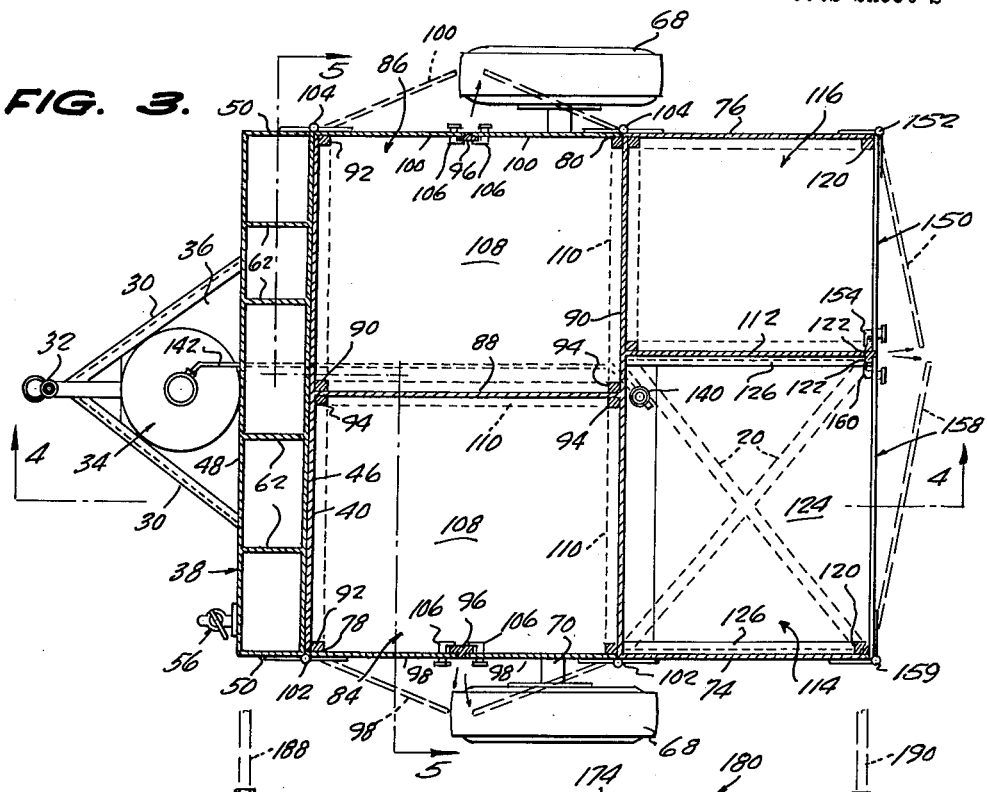
INVENTOR.
EUGENE P. GARRISON, SR.
BY
McMorrow, Berman & Davidson
ATTORNEYS.

Jan. 15, 1963  E. P. GARRISON, SR  3,073,646
KITCHEN TRAILER

Filed March 31, 1961  3 Sheets-Sheet 3

INVENTOR.
EUGENE P. GARRISON, SR.
BY
McMorrow, Berman & Davidson
ATTORNEYS.

United States Patent Office 3,073,646
Patented Jan. 15, 1963

3,073,646
KITCHEN TRAILER
Eugene P. Garrison, Sr., Box 1, Menard, Tex.
Filed Mar. 31, 1961, Ser. No. 99,955
6 Claims. (Cl. 296—22)

This invention relates to improvements in mobile kitchens, and more particularly to a novel kitchen trailer suitable for use by vacationers, hunters, and field workers and others.

The primary object of the invention is the provision of a more compact, practical, and convenient kitchen trailer which contains complete cooking, refrigerating, and storage facilities for water, food, and cooking utensils.

Another object of the invention is the provision of a two-wheel kitchen trailer of the character indicated above, which has a luggage rack on its top for carrying bedding and tent-forming canvas, and the rack is constructed to support a knock-down tent ridge pole assembly, which is storable in the luggage rack, and which serves for the erection of a protective tent which extends over and around the kitchen trailer.

A further object of the invention is the provision of a kitchen trailer of the character indicated above, which is simple and uncomplicated in structure, and which is designed to be made in rugged and well-finished forms, at relatively low cost, from readily available metal sheeting and plates, pipe and pipe fittings, and bars.

Other important objects and advantageous features of the invention will be apparent from the following description and the accompanying drawings, wherein, for purposes of illustration only, a specific form of the invention is set forth in detail.

In the drawings:

FIGURE 1 is a perspective view showing a tent erected over a kitchen trailer in accordance with the present invention;

FIGURE 2 is an enlarged perspective view of a kitchen trailer of the present invention, showing, in phantom lines, a tent erected thereover and supported on a ridge pole assembly;

FIGURE 3 is a horizontal section taken on the line 3—3 of FIGURE 2, wherein doors are shown in closed positions in full lines and in open positions in phantom lines;

FIGURE 4 is a vertical longitudinal section taken on the line 4—4 of FIGURE 3, showing a cooking stove supporting shelf in retracted storage position in full lines, and in extended use position in phantom lines;

Figure 5:
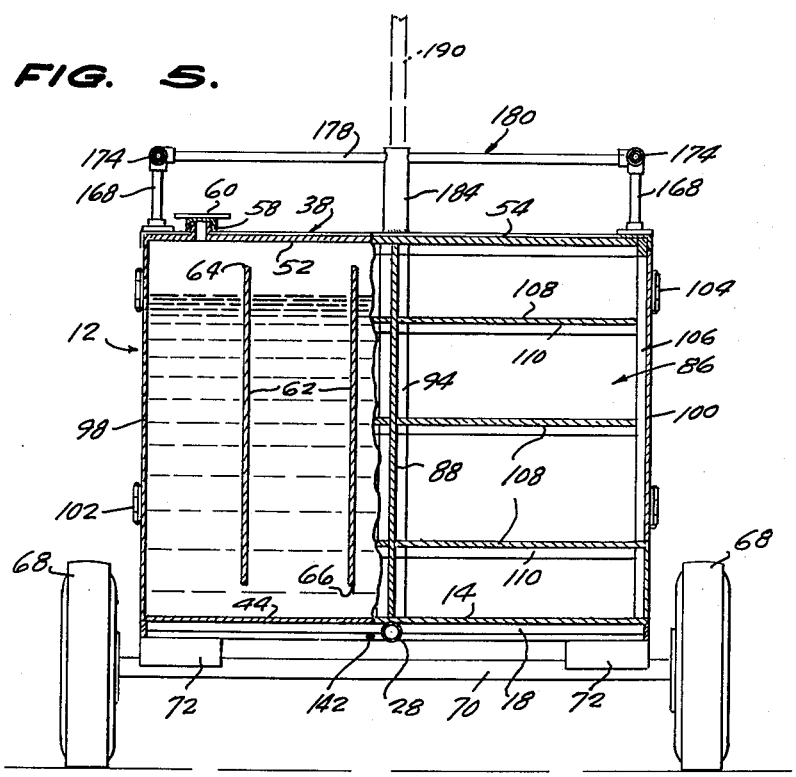
FIGURE 5 is a vertical transverse section taken on the line 5—5 of FIGURE 3.

Referring in detail to the drawings, wherein like numerals designate like parts throughout the several views, the illustrated kitchen trailer, generally designated 10, comprises a longitudinally elongated hollow rectangular body 12, which is preferably longer and wider than it is high, and formed of sheet metal and stiffening bars. The body 12 comprises a flat rectangular bottom wall 14, which has extending along its sides and its rear end, downwardly extending stiffening bars 16 and 18, respectively. Crossed and intersecting reinforcing bars 20 are fixed to the underside of the bottom wall 14, in a left rear area thereof, as indicated in FIGURE 3, to provide extra support for a refrigerator 22 resting thereon, the refrigerator here being shown as a butane gas operated refrigerator, for use where electricity is not available. An electric refrigerator could be used instead where the trailer is to be used at locations having electricity available.

Stiffening intermediate cross bars 24 and 26, respectively, are fixed to the underside of the bottom wall 14 and to the side bars 16, and a centered longitudinally extending trailer hitch pipe 28 is fixed to the underside of the bottom wall 14 and extends forwardly therefrom, and is fixed, near the forward end, to the forward ends of forwardly converging braces 30, whose rear ends are fixed to a forward part of the body 12. A suitable hitch 32 is mounted on the forward end of the pipe 28. A replaceable butane gas cylinder 34 is supported on a plate 36 extending between the braces 30.

A relatively narrow water tank 38 extends the full height and width of the body 12 and is suitably secured to the front wall 40 of the body 12, and rests upon a forward cross bar 42 which extends between and is fixed to extensions of the bottom plate side bars 16. The tank 38 has a bottom wall 44, preferably on a level with the body bottom wall 14, a rear wall 46 engaged with the body front wall 40, a front wall 48, end walls 50, and a top wall 52 which is preferably on a level with the top wall 54 of the body 12. A drain and outlet spigot 56 is secured through a lower part of the tank front wall 48, and an upstanding filling neck 58 is provided on the tank top tank wall 52, closed by a removable cap 60. In order to eliminate sloshing and unwanted lateral shifting of water within the tank 38, a plurality of transversely spaced parallel vertical baffle plates 62 are provided, which are secured to the front and rear walls 48 and 46, respectively, and have upper and lower edges 64 and 66, which are spaced from the top wall 52 and the bottom wall 44, respectively.

The body 10 is supported on suitable wheels 68 which are journaled on the ends of a transversely extending pipe axle 70, which is located intermediate the ends of the body, and is connected to the body bottom wall 14, by means of pairs of transversely extending plates 72 which are fixed to and extend laterally inwardly from the side bars 16, and are suitably fixed to related sides of the axle 70. Any other suitable suspension for the axle 70 can be employed.

The body 12 further comprises side walls 74 and 76 which are formed with rectangular forward openings 78 and 80 which extend downwardly from the body top wall 54, to points 82, spaced from the lower ends of the side walls, which openings provide access to left and right hand storage compartments 84 and 86, respectively. These storage compartments are defined by a vertical longitudinal and centered partition wall 88 which extends rearwardly from the body front wall 40, to a vertical transverse partition wall 90. The transverse partition wall 90 is located in forwardly spaced relation to the rear end of the body 12. Where the front wall 40 meets the side walls 74 and 76, interior vertical stiffening bars 92 are fixed, and outer vertical stiffening bars 94 are fixed at opposite sides of the longitudinal partition wall 88, at the meetings of the wall 88 with the front wall 40 and the transverse partition wall 90. Vertical stop bars 96 extend between and are fixed to the bottom wall 14 and the top wall 54, and extend outwardly across the side wall openings 78 and 80.

Pairs of doors 98 and 100 are hinged, as indicated at 102 and 104, to the side walls 74 and 76, along opposed vertical edges of the openings 78 and 80, and have free edges which, in the closed positions of the doors, bear against related portions of the stop bars 96. L-shaped rotary catches 106 are journaled through the doors, at their free edges, to engage behind the stop bars 96, to hold the doors securely closed.

The compartments 84 and 86 are provided with adjustable shelves 108, which are supported on cleats 110, which are suitably supported on the body front wall 40 and the transverse partition wall 90, and the partition wall 88.

The space within the body 12, behind the transverse partition wall 90 is divided by an off-center vertical longitudinal partition wall 112, into a relatively large left-hand refrigerator and cooking stove accommodating compartment 114, and a smaller right-hand cooking utensil storage compartment 116. The body 12 has an abbreviated rear wall 118 which extends only across the lower part of the rear of the compartment 116, but the rear wall 118 is supplemented by vertical stiffening bars 120 which are fixed to and extend between the rear corners of the bottom wall 14 and the top wall 54, and by vertical stiffening bars 122 which are secured to the top and bottom walls and to the opposite sides of the partition wall 112 at its rear edge. The refrigerator 22 is non-shiftably mounted on the body bottom wall 14, within the compartment 114, beneath a pull-out shelf 124, whose sides edges are slidably engaged in channels 126 which are suitably fixed to the left-hand side wall 74 and the partition wall 112. The shelf 124 has pivoted to its underside, as indicated at 126, a pendant support arm 128, having a closed longitudinal slot 130 at its lower end, through which extends a bolt 132 fixed to the partition wall 112. A wing nut 134 on the bolt 132 provides for locking the arm 128 in a rearwardly angled position, for supporting the shelf in a rearwardly extended use position, as shown in phantom lines in FIGURE 4. A suitable cooking stove 136 is suitably secured upon the shelf 124, and is here shown as being a butane gas stove, having a flexible hose 138 leading therefrom to a vertical part 140 of a butane gas supply pipe having a horizontal part 142 leading forwardly along and above the body bottom wall 14, and, at its forward end, descending therethrough and suitably connected to the butane gas cylinder 34. The vertical part 140 of the gas supply pipe has an upper shut-off cock 144, on its upper end, to which the stove hose 138 is connected, and a lower shut-off cock 146, to which the refrigerator 22 is connected.

The right-hand rear compartment 116 is provided with vertically spaced shelves 148, and with a door 150 which is hinged, as indicated at 152, at its laterally outward edge, to the meeting of the right-hand body side wall 76 and a related stiffening bar 120. The door 150 is provided, at its laterally inward edge, with a rotatable catch 154, to engage behind a related one of the stiffening bars 122, as shown in FIGURE 3, for holding the bar 150 securely closed. The abbreviated rear wall 118, below the door 150, can be provided with a suitably energized tail-light 156.

A door 158 is provided for closing the open rear end of the left-hand rear compartment 114, which is hinged, as indicated at 159, at its laterally outward edge to the adjacent part of the left-hand side wall 74, and has a rotary catch 160, at its free inward edge, for engaging behind the related one of the stiffening bars 122.

The body top wall 54 is provided with a pendant peripheral reinforcing flange 162, which is part of an angle iron 164 extending around the top wall, and the flange 162 is secured to the outer sides of the side walls 74 and 76, and the outer side of the water tank front wall 48, and, along the rear edge of the top wall 54. The iron 164 has a bottom flange 166, to which the upper ends of the stiffening bars 122 are fixed, as shown in FIGURE 4. Fixed to and upstanding from the corners of the top wall 54, are standards 168, having three-way fittings 170 fixed on their upper ends. Threaded into the horizontal arms 172 of the fittings 170 are longitudinal bars or pipes 174, and front and rear transverse bars or pipes 176 and 178, respectively, which with the top wall and the standards 168 define a luggage rack 180. The luggage rack 180 is reinforced by front and rear tubular standards 182 and 184 which are fixed to and extend between the top wall 54 and the front and rear transverse bars 176 and 178, respectively, at the middle thereof.

Figure 6:
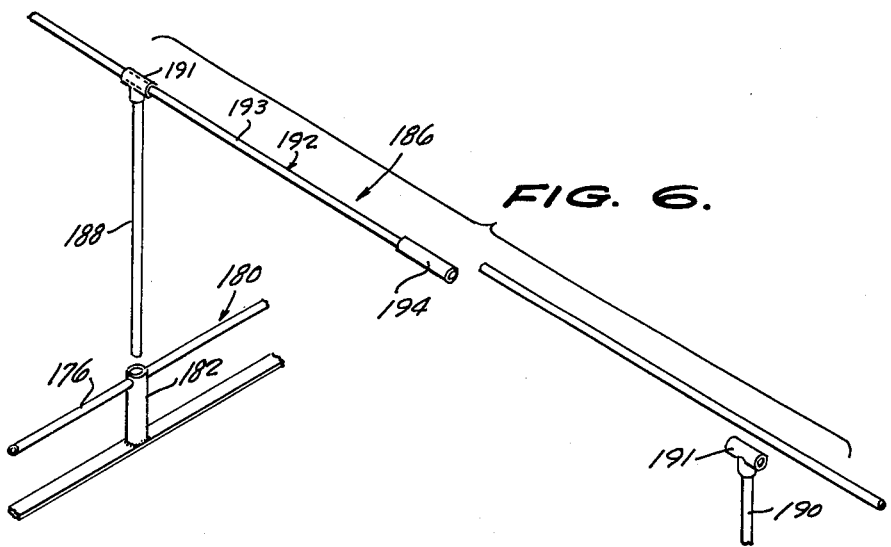
FIGURE 6 is an enlarged fragmentary and exploded perspective view of the ridge pole assembly and an associated part of the luggage rack.

The tubular standards 182 and 184 serve as mounting means for a tent ridge pole assembly 186, which comprises front and rear vertical rods or pipes 188 and 190, whose lower ends are removably engaged in the standards 182 and 184, and have T-fittings 191 on their upper ends, through which are slidably engaged related portions of a horizontal longitudinal ridge pole 192. As shown in FIGURE 6, the ridge pole 192 is composed of knockdown sections 193 and 195. The section 193 has a connecting sleeve 194 on its rear end, into which the forward end of the section 195 is adapted to be engaged to assemble the ridge pole.

As shown in FIGURES 1 and 2, the ridge pole assembly 186, when mounted on the luggage rack 180 over the trailer body 12, is adapted to support a tent 196 which is preferably composed of a rectangular canvas 198, of substantially the same width as the ridge pole 192 and of sufficient length that, when its midlength point is engaged over the ridge pole 192, sufficient material extends from opposite sides of the ridge pole to provide outwardly declining roof panels 200 and pendant vertical side wall panels 202. Tent ropes 204 are secured to the canvas, at the meetings of the roof panels 200 and the wall panels 202, to be tied to tent pegs 206, driven into the ground, at some distance from the wall panels, and the lower edges of the wall panels 202 are adapted to be pegged to the ground, as indicated at 208.

End wall panels 210 can be provided, which are secured to related ends of the roof panels 200 and the side wall panels 202, and the end wall panels 210 are preferably composed of vertically divided sections 212 whose inner edges are connectible together, when desired, as by means of a slide fastener 214. It is to be noted that the ends of the ridge pole 192 extend far enough, forwardly and rearwardly from the body 12, and the canvas 198 is of corresponding width, so that working room is provided within the tent, at the ends of the body 12, even when the end wall panels 210 are in place and closed. The side wall panels 202 are spaced laterally outwardly from the sides of the body 12 to provide working spaces thereat.

In a preferred arrangement, the ridge pole assembly 186, the canvas 198, including the end wall panels 210, which can be separably connected to the canvas, are proportioned so that they can be compactly disposed in the luggage rack 180, when not in use, and still provide for the accommodation, in the luggage rack, for other articles.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A kitchen trailer comprising a hollow body having a bottom wall, a forward end wall, a rear end wall, first and second side walls, and a top wall, a transverse axle beneath and connected to the body at a point intermediate the ends of the body, wheels journaled on the axle at the opposite sides of the body, and a draw bar assembly secured to the body and extending forwardly therefrom, a water tank in front of the body and mounted on the body, said water tank being substantially as wide and as tall as the body, said tank having a top wall substantially on a level with the top wall of the body, and a luggage rack overlying and supported upon the top walls of the tank and the body, said luggage rack comprising standards rising from the tank top wall and rear corners of the body top wall, and longitudinal and transverse rods extending between related standards and spaced above the top walls, vertical tubular standards rising from said top walls and spaced between the rack standards at the forward and rear ends of the body, the tubular standards being connected to the transverse rods, and a tent ridge pole assembly supportably engaged with the tubular standards.

2. A kitchen trailer comprising a hollow body having a bottom wall, a forward end wall, a rear end wall, first and second side walls, and a top wall, a transverse axle beneath and connected to the body at a point intermediate the ends of the body, wheels journaled on the axle at the opposite sides of the body, and a draw bar assembly secured to the body and extending forwardly therefrom, a water tank in front of the body and mounted on the body, said water tank being substantially as wide and as tall as the body, said tank having a top wall substantially on a level with the top wall of the body, and a luggage rack overlying and supported upon the top walls of the tank and the body, said luggage rack comprising standards rising from the tank top wall and rear corners of the body top wall, and longitudinal and transverse rods extending between related standards and spaced above the top walls, vertical tubular standards rising from said top walls and spaced between the rack standards at the forward and rear ends of the body, the tubular standards being connected to the transverse rods, and a tent ridge pole assembly supportably engaged with the tubular standards, said ridge pole assembly comprising uprights having lower ends removably engaged in the tubular standards, T-fittings on the upper ends of the uprights, and a ridge pole extending between and slidably engaged through the T-fittings.

3. A kitchen trailer comprising a hollow body having a bottom wall, a forward end wall, a rear end wall, first and second side walls, and a top wall, a transverse axle beneath and connected to the body at a point intermediate the ends of the body, wheels journaled on the axle at the opposite sides of the body, and a draw bar assembly secured to the body and extending forwardly therefrom, a water tank in front of the body and mounted on the body, said water tank being substantially as wide and as tall as the body, said tank having a top wall substantially on a level with the top wall of the body, and a luggage rack overlying and supported upon the top walls of the tank and the body, said luggage rack comprising standards rising from the tank top wall and rear corners of the body top wall, and longitudinal and transverse rods extending between related standards and spaced above the top walls, vertical tubular standards rising from said top walls and spaced between the rack standards at the forward and rear ends of the body, the tubular standards being connected to the transverse rods, and a tent ridge pole assembly supportably engaged with the tubular standards, said ridge pole assembly comprising uprights having lower ends removably engaged in the tubular standards, T-fittings on the upper ends of the uprights, and a ridge pole extending between and slidably engaged through the T-fittings, said ridge pole comprising separably connected sections having ends reaching forwardly and rearwardly beyond the forward and rear ends of the trailer body.

4. A kitchen trailer comprising a hollow body having a bottom wall, a forward end wall, a rear end wall, first and second side walls, and a top wall, a transverse axle beneath and connected to the body at a point intermediate the ends of the body, wheels journaled on the axle at the opposite sides of the body, and a draw bar assembly secured to the body and extending forwardly therefrom, a water tank in front of the body and mounted on the body, said water tank being substantially as wide and as tall as the body, said tank having a top wall substantially on a level with the top wall of the body, and a luggage rack overlying and supported upon the top walls of the tank and the body, said luggage rack comprising standards rising from the tank top wall and rear corners of the body top wall, and longitudinal and transverse rods extending between related standards and spaced above the top walls, vertical tubular standards rising from said top walls and spaced between the rack standards at the forward and rear ends of the body, the tubular standards being connected to the transverse rods, and a tent ridge pole assembly supportably engaged with the tubular standards, said ridge pole assembly comprising uprights having lower ends removably engaged in the tubular standards, T-fittings on the upper ends of the uprights, and a ridge pole extending between and slidably engaged through the T-fittings, a tent canvas as wide as the length of the ridge pole and long enough to reach beyond the opposite sides of the trailer body with an intermediate part thereof bearing upon the ridge pole, and define laterally outwardly declining roof panels, tent ropes connected at one end to the outer ends of the roof panels and connected at their other ends to the ground at points spaced from the sides of the trailer body.

5. A kitchen trailer comprising a hollow body having a bottom wall, a forward end wall, a rear end wall, first and second side walls, and a top wall, a transverse axle beneath and connected to the body at a point intermediate the ends of the body, wheels journaled on the axle at the opposite sides of the body, and a draw bar assembly secured to the body and extending forwardly therefrom, a water tank in front of the body and mounted on the body, said water tank being substantially as wide and as tall as the body, said tank having a top wall substantially on a level with the top wall of the body, and a luggage rack overlying and supported upon the top walls of the tank and the body, said luggage rack comprising standards rising from the tank top wall and rear corners of the body top wall, and longitudinal and transverse rods extending between related standards and spaced above the top walls, vertical tubular standards rising from said top walls and spaced between the rack standards at the forward and rear ends of the body, the tubular standards being connected to the transverse rods, and a tent ridge pole assembly supportably engaged with the tubular standards, said ridge pole assembly comprising uprights having lower ends removably engaged in the tubular standards, T-fittings on the upper ends of the uprights, and a ridge pole extending between and slidably engaged through the T-fittings, a tent canvas as wide as the length of the ridge pole and long enounght to reach beyond the opposite sides of the trailer body with an intermediate part thereof bearing upon the ridge pole, and define laterally outwardly declining roof panels, tent ropes connected at one end to the outer ends of the roof panels and connected at their other ends to the ground at points spaced from the sides of the trailer body, said roof panels having pendant side wall panels on their outer ends, and means for securing the lower ends of the side wall panels to the ground.

6. A kitchen trailer comprising a hollow body having a bottom wall, a forward end wall, a rear end wall, first and second side walls, and a top wall, a transverse axle beneath and connected to the body at a point intermediate the ends of the body, wheels journaled on the axle at the opposite sides of the body, and a draw bar assembly secured to the body and extending forwardly therefrom, a water tank in front of the body and mounted on the body, said water tank being substantially as wide and as tall as the body, said tank having a top wall substantially on a level with the top wall of the body, and a luggage rack overlying and supported upon the top walls of the tank and the body, said luggage rack comprising standards rising from the tank top wall and rear corners of the body top wall, and longitudinal and transverse rods extending between related standards and spaced above the top walls, vertical tubular standards rising from said top walls and spaced between the rack standards at the forward and rear ends of the body, the tubular standards being connected to the transverse rods, and a tent ridge pole assembly supportably engaged with the tubular standards, said ridge pole assembly comprising uprights having lower ends removably engaged in the tubular standards, T-fittings on the upper ends of the uprights, and a ridge pole extending between and slidably engaged through the T-fittings, a tent canvas as wide as the length of the ridge pole and long enough to reach beyond the opposite sides of the trailer body with an intermediate part thereof bearing upon the ridge pole, and define laterally outwardly declining roof panels, tent ropes connected at one end to the outer ends of the roof panels and connected at their other ends to the ground at points spaced from the sides of the trailer body, said roof panels having pendant side wall panels on their outer ends, and means for securing the lower ends of the side wall panels to the ground, and vertical end wall panels connected to the side edges of the canvas and extending between the side wall panels, said end wall panels being vertically divided and comprising separable sections.

References Cited in the file of this patent

UNITED STATES PATENTS

| | | |
|---|---|---|
| 1,883,991 | Ledwinka | Oct. 25, 1932 |
| 1,945,089 | Small | Jan. 30, 1934 |
| 2,329,419 | Reed | Sept. 14, 1943 |
| 2,481,230 | MacDonald | Sept. 6, 1949 |
| 2,551,207 | Ensor | May 1, 1951 |
| 2,779,621 | Vale | Jan. 29, 1957 |
| 2,833,000 | Jurgensen | May 6, 1958 |
| 2,840,101 | Saylor | June 24, 1958 |

FOREIGN PATENTS

| | | |
|---|---|---|
| 168,940 | Austria | Sept. 25, 1951 |